US007443859B2

(12) United States Patent
Sengodan (10) Patent No.: US 7,443,859 B2
(45) Date of Patent: Oct. 28, 2008

(54) METHOD AND APPARATUS FOR ADDRESS ALLOCATION IN GPRS NETWORKS THAT FACILITATES END-TO-END SECURITY

(75) Inventor: Senthil Sengodan, Burlington, MA (US)

(73) Assignee: Nokia Corporation, Espoo (FI)

( * ) Notice: Subject to any disclaimer, the term of this patent is extended or adjusted under 35 U.S.C. 154(b) by 994 days.

(21) Appl. No.: 10/017,398

(22) Filed: Dec. 18, 2001

(65) Prior Publication Data

US 2003/0112793 A1    Jun. 19, 2003

(51) Int. Cl.
*H04L 12/28* (2006.01)
(52) U.S. Cl. .................. 370/395.3; 370/349; 370/474
(58) Field of Classification Search .......... 370/395.3, 370/349, 338, 474
See application file for complete search history.

(56) References Cited

U.S. PATENT DOCUMENTS

| | | | |
|---|---|---|---|
| 5,590,133 A | 12/1996 | Billström et al. | |
| 5,708,655 A | 1/1998 | Toth et al. | |
| 5,793,763 A | 8/1998 | Mayes et al. | |
| 6,353,891 B1 | 3/2002 | Borella et al. | |
| 6,466,556 B1 * | 10/2002 | Boudreaux | 370/331 |
| 6,687,252 B1 * | 2/2004 | Bertrand et al. | 370/401 |
| 6,711,147 B1 * | 3/2004 | Barnes et al. | 370/338 |
| 2001/0048686 A1 * | 12/2001 | Takeda et al. | 370/401 |
| 2002/0080757 A1 * | 6/2002 | Narvanen et al. | 370/338 |
| 2002/0116502 A1 * | 8/2002 | Iyer et al. | 709/227 |
| 2003/0026230 A1 * | 2/2003 | Ibanez et al. | 370/338 |
| 2003/0081578 A1 * | 5/2003 | White et al. | 370/338 |
| 2004/0037242 A1 * | 2/2004 | Shi et al. | 370/329 |

OTHER PUBLICATIONS

Network intelligence for GPRS; Depaoli, R.; Moiso, C.; Intelligent Network Workshop, 2001 IEEE; May 6-9, 2001 pp. 4-8.*
R. Hinden et al., "IP Version 6 Addressing Architecture", Jul. 1998, http://www.ietf.org/rfc/rfc2373.txt?number=2373 printed on Mar. 13, 2002, 25 pages.
S. Kent et al., "Security Architecture For The Internet Protocol", Nov. 1998, http://www.ietf.org/rfc/rfc2401.txt?number=2401 printed on Mar. 13, 2002, 62 pages.

(Continued)

*Primary Examiner*—Firmin Backer
*Assistant Examiner*—Jason Mattis
(74) *Attorney, Agent, or Firm*—Banner & Witcoff, Ltd.

(57) ABSTRACT

A General Packet Radio System (GPRS)-based communications network that includes a Serving GPRS Support Node (SGSN) and a Gateway GPRS Support Node (GGSN) assigns an IPv4 address to a mobile station in a GPRS-based network that conserves IPv4 addresses and simultaneously maintains end-to-end security and application friendliness. The SGSN receives from a mobile station an Activate PDP Context Request message having an APN field that requests a private or a public network address. The SGSN then sends a Create PDP Context Request message to the GGSN. The GGSN assigns a private or a public network address to the mobile station, and sends a Create PDP Context Response message to the SGSN. In turn, the SGSN sends an Activate PDP Context Accept message to the mobile station assigning a private or a public network address to the mobile station.

26 Claims, 6 Drawing Sheets

OTHER PUBLICATIONS

P. Srisuresh et al., "IP Network Address Translator (NAT) Terminology and considerations", Aug. 1999, http://www.ietf.org/rfc/rfc2663.txt?number=2663, printed on Mar. 13, 2002, 29 pages.

M. Borella et al., "Realm Specific IP: Framework", Oct. 2001, http://ww.ietf.org/rfc/rfc3102.txt?number=3102, printed on Mar. 13, 2002, 29 pages.

M. Borella et al., "Realm Specific IP: Protocol Specification", Oct. 2001, http://www.ietf.org/rfc/rfc3103.txt?number=3103, printed on Mar. 13, 2002, 51 pages.

G. Montenegro et al., "RSIP Support for End-to-end Ipsec", Oct. 2001, http://www.ietf.org/rfc/rfc3104.txt?number=3104, printed on Mar. 13, 2002, 18 pages.

J. Kempf et al., "Finding an RSIP Server with SLP", Oct. 2001, http://www.ietf.org/rfc/rfc3105.txt?number=3105, printed on Mar. 13, 2002, 11 pages.

ETSI EN 301 344 V7.1.1 (Jan. 2000), Digital cellular telecommunications system (Phase 2+); General Packet Radio Service (GPRS); Service description; Stage 2 (GSM 03.60 version 7.1.1 Release 1998), 115 pages.

* cited by examiner

METHOD AND APPARATUS FOR ADDRESS ALLOCATION IN GPRS NETWORKS THAT FACILITATES END-TO-END SECURITY

BACKGROUND OF THE INVENTION

1. Field of the Invention

The invention relates to General Packet Radio System (GPRS) and GPRS-based networks. More particularly, the present invention relates to a method and system that assigns a network address to a mobile station in a GPRS network or a GPRS-based network.

2. Background of the Invention

IPv4 is the version of IP (Internet Protocol) that is currently deployed in enterprise networks, as well as the public Internet. One of the limitations of IPv4 is that it has a limited address space. Consequently, in order to conserve addresses, enterprises and other administrative domains (ADs) have resorted to using private addresses. Private addresses are network addresses in which the IP address falls within the ranges of

[10.0.0.0-10.255.255.255],
[172.16.0.0-172.31.255.255], or
[192.168.0.0-192.168.255.255].

Private addresses that are assigned by an administrative entity within an administrative domain have relevance only within the administrative domain. Accordingly, such private addresses must not be visible outside the administrative domain. An advantage of using private addresses is that different administrative domains may assign the same private IP address to hosts within their respective administrative domains without any concern of conflict. On the other hand, a Network Address Translator (NAT) is used when a host that is assigned a private address within an administrative domain intends to send an IP datagram to a host that is outside the administrative domain of the sending host. A NAT transforms a private IP address (and possibly other selected fields within the datagram) into a public IP address prior to the IP datagram being sent outside the administrative domain associated with the NAT. Similarly, when an IP datagram is sent from a host that is outside the administrative domain associated with the NAT to a host with a private address, then the NAT transforms a public IP address to a private address.

Figure 1:
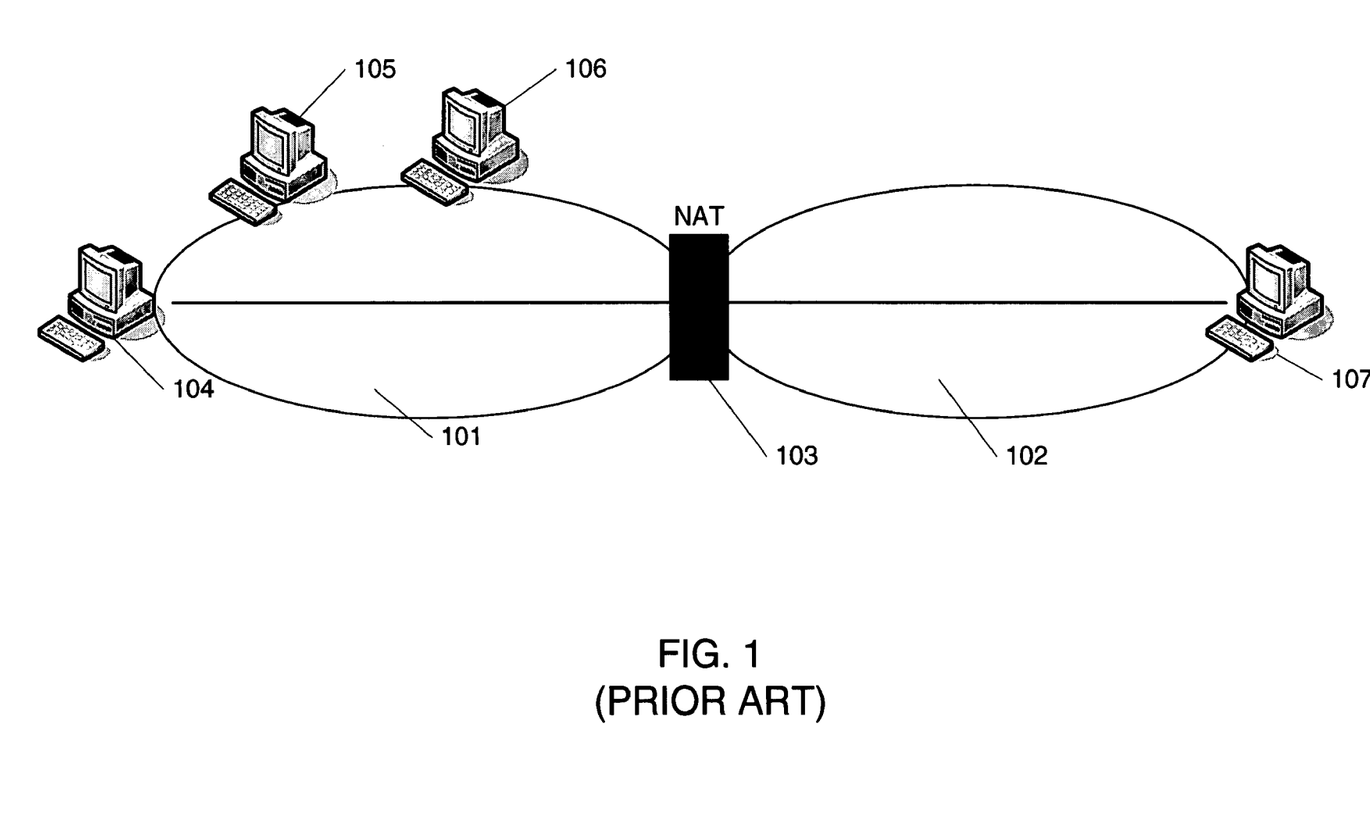
FIG. 1 depicts a prior art private administrative domain and a public administrative domain that are separated by a NAT for illustrating a conventional NAT-based address assignment operation.

FIG. 1 depicts two administrative domains 101 and 102 that are separated by a NAT 103. Domain 101 is a private administrative domain, while domain 102 is a public administrative domain, such as the Internet. Private domain 101 includes a plurality of IP (Internet Protocol) devices 104, 105 and 106 that each provide functionality that includes host and/or client and/or server functionality in a well-known manner. Public domain 102 also includes a plurality of IP devices, of which only IP device 107 is shown. Each IP device of public domain 102 provides functionality that includes host and/or client and/or server functionality in a well-known manner. It should be understood that both domains 101 and 102 could include any number of IP devices that are not shown in FIG. 1. As used herein, the term "IP device" is a network device that provides at least host and/or client and/or server functionality in a well-known manner.

To illustrate a conventional NAT-based address assignment operation, consider a situation in which IP device 104 within private domain 101 intends to send a datagram to IP device 107 in public domain 102. IP device 104 sends the datagram to IP device 107. NAT 103 intercepts the datagram and translates the address contained in the datagram to a valid address in the public address space. NAT 103 then forwards the datagram containing the translated address to IP device 107. When IP device 107 sends a return (or an initial) datagram to IP device 104, NAT 103 receives the datagram containing a "public" address for IP device 104, translates the address to a corresponding private address in private domain 101, and forwards the datagram to IP device 104.

Use of private addresses within an administrative domain and use of a NAT at the edge of an administrative domain has been widely adopted and deployed within enterprises. There are, however, two major drawbacks associated with use of a NAT. The first major drawback is that the NAT-based approach breaks the end-to-end security model by changing the destination address of a datagram and thereby invalidating the authentication header of the datagram. The second major drawback is that certain types of applications cannot work in the presence of a NAT, unless remedial measures are taken, such as the inclusion of an application gateway (proxy). For example, when an IP address is embedded into an application protocol data unit (PDU), an ALG (Application Level Gateway) is required so that the embedded IP address is changed because a conventional NAT-based address assignment operation will not change the embedded IP address.

In order to overcome the disadvantages associated with NATs, i.e., the security break and the "unfriendliness" toward some applications, a mechanism commonly referred to as Realm Specific IP (RSIP) has gained significant support within the Internet Engineering Task Force (IETF).

According to RSIP, when a host (i.e., an RSIP client) needs an IP address assigned, the host indicates to an RSIP server that is responsible for assigning IP addresses whether the desired IP address is needed for communicating with a IP device within the administrative domain of the requesting host, or is needed for communicating with a host/client outside the administrative domain of the requesting host. Based on the nature of the request, the RSIP server assigns a private IP address or a public IP address to the requesting host.

Figure 2A:
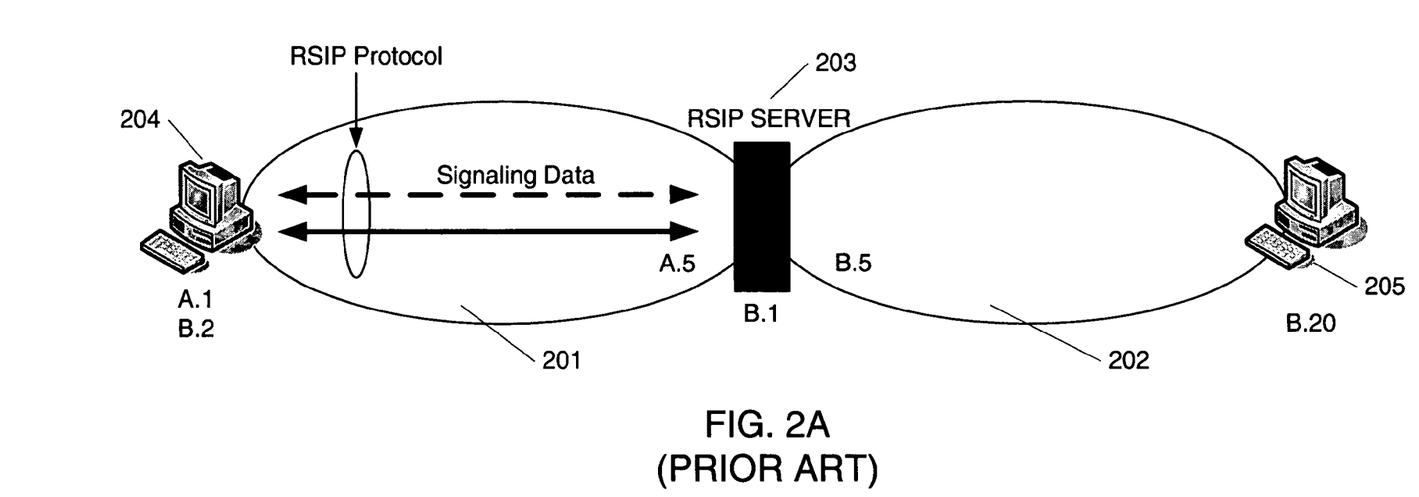
FIG. 2a depicts a prior art private administrative domain and a public administrative domain that are separated by an RSIP server for illustrating a conventional RSIP-based address assignment operation.

FIG. 2a depicts two administrative domains 201 and 202 that are separated by an RSIP server 203. Domain 201 is a private administrative domain, while domain 202 is a public administrative domain, such as the Internet. Private domain 201 includes a plurality of IP devices, of which only IP device 204 is shown. IP device 204 provides functionality that includes host and/or client and/or server functionality in a well-known manner. Public domain 202 also includes a plurality of IP devices, of which only IP device 205 is shown. Each IP device of public domain 202 provides functionality that includes host and/or client and/or server functionality in a well-known manner. It should be understood that both domains 201 and 202 could include any number of IP devices that are not shown in FIG. 2a.

When IP device 204 desires to send a datagram to IP device 205, IP device 204 sends a datagram 206a (FIG. 2b) to RSIP server 203 containing an outer IP header 207, an inner IP header 208 and a payload 209. Outer IP header 207 contains the private address (i.e., A.1) for IP device 204 in a source (Src) field, and the private address (i.e., A.5) for RSIP server 203 in a destination (Dst) field. Inner IP header 208 contains the public address (B.2) that the RSIP server assigns device 204 in an src field, and the public address (B.20) for IP device 205 in a Dst field. RSIP server 203 removes the outer IP header and sends datagram 206b (FIG. 2b) to IP device 205 using the public address (B.20) for IP device 205 in a Dst field and the public address (B.2) for IP device 204 in an Src field.

Figure 2B:
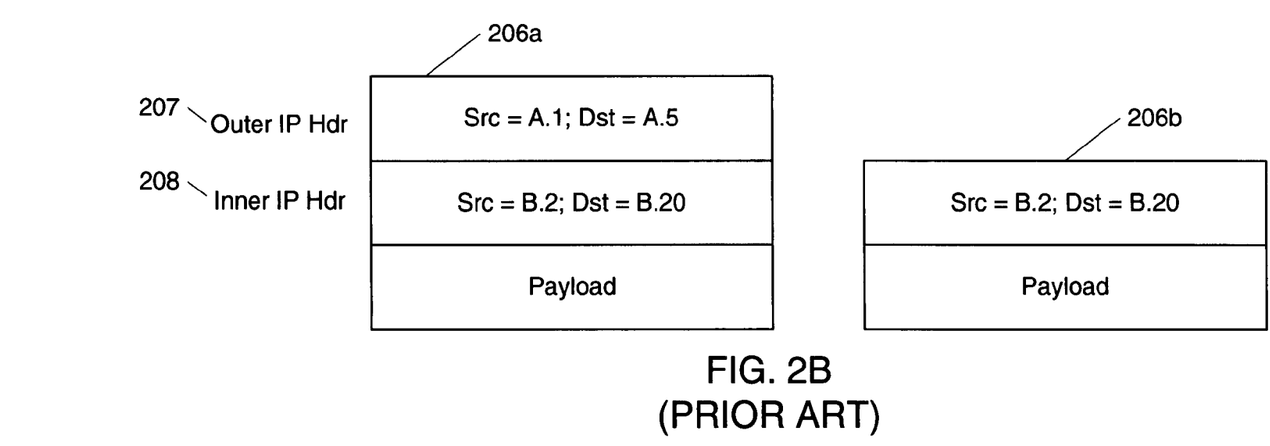
FIG. 2b depicts a prior art datagram within an RSIP-based system.

When IP device 205 sends a datagram to IP device 204, IP device 205 sends a datagram containing the public address (B.20) for IP device 205 in an Src field and the public address (B.2) for IP device 204 in a Dst field. RSIP server 203 encapsulates the received datagram using an outer IP header containing a private address (A.1) for IP device 204 in a Dst field and the private address (A.5) for RSIP server 203 in an Src field.

Thus, when a private IP address is assigned to a requesting host, the IP datagram does not leave the administrative domain. When an IP datagram leaves an administrative domain, the address that is assigned to the transmitting host is a public IP address. Consequently, the RSIP protocol makes use of a NAT unnecessary, and thereby avoids the drawbacks involving NATs.

In the case of a General Packet Radio System (GPRS) network or a GPRS-based network (such as a Universal Mobile Telecommunications System (UMTS)), a Mobile Station (MS) is assigned an IP address by a Gateway GPRS Support Node (GGSN). Currently, such an IP address is an IPv4 address. The protocol that is used for address assignment is specific to GPRS networks and is referred to as PDP Context Activation. PDP (Packet Data Protocol) is an acronym that is used within GPRS networks to refer to IP addresses, X.25 addresses, etc. An administrative domain within GPRS networks (and within cellular networks, in general) is referred to as a PLMN (Public Land Mobile Network).

Figure 3:
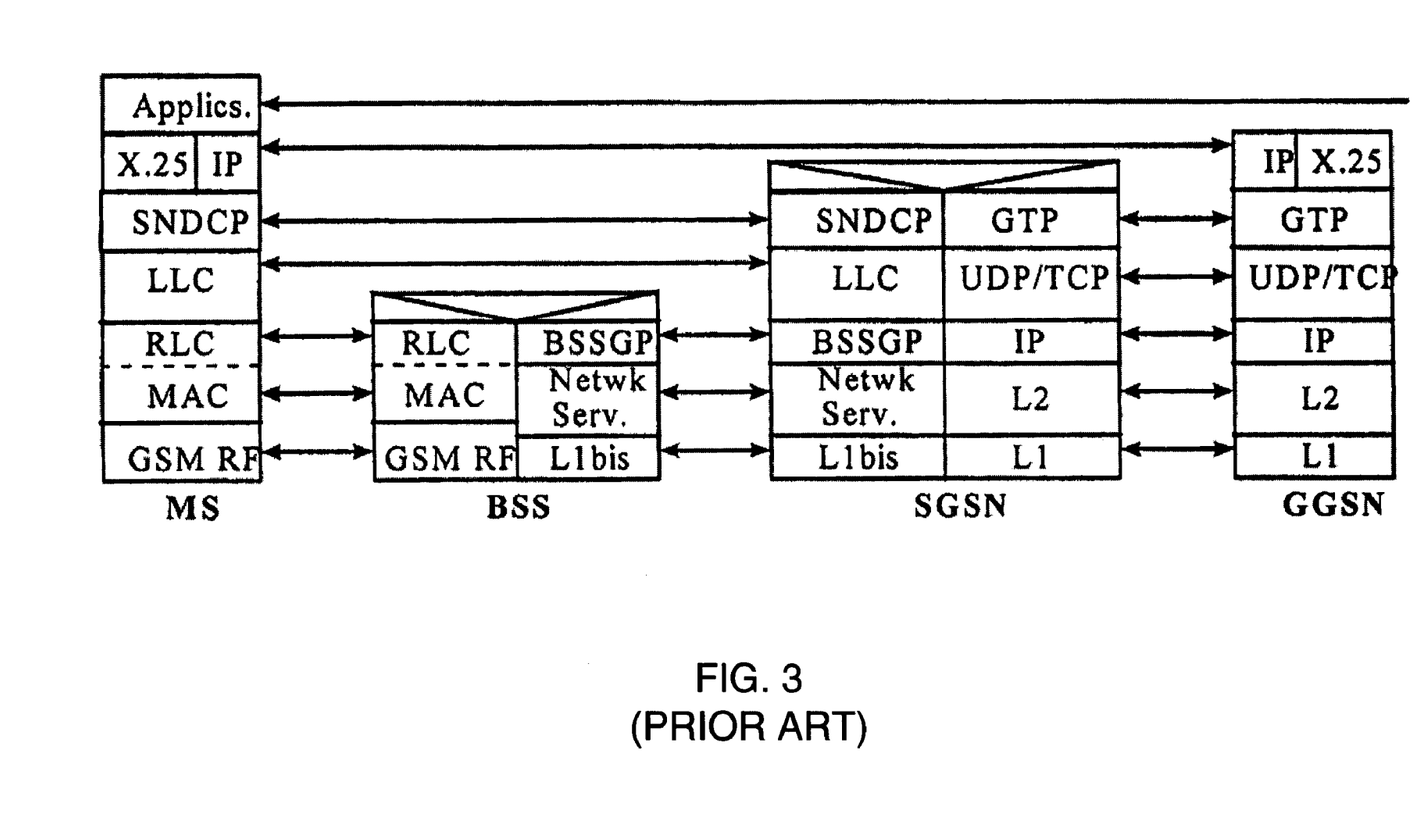
FIG. 3 shows prior art conventional generic GPRS protocol stacks for a mobile station (MS), base station subsystem (BSS), Serving GPRS Support Node (SGSN) and the Gateway GPRS Support Node (GGSN)

FIG. 3 shows generic GPRS protocol stacks for a mobile station (MS), base station subsystem (BSS), Serving GPRS Support Node (SGSN) and the Gateway GPRS Support Node (GGSN). The IP address for the MS may be seen on the protocol stack for the MS.

Figure 4A:
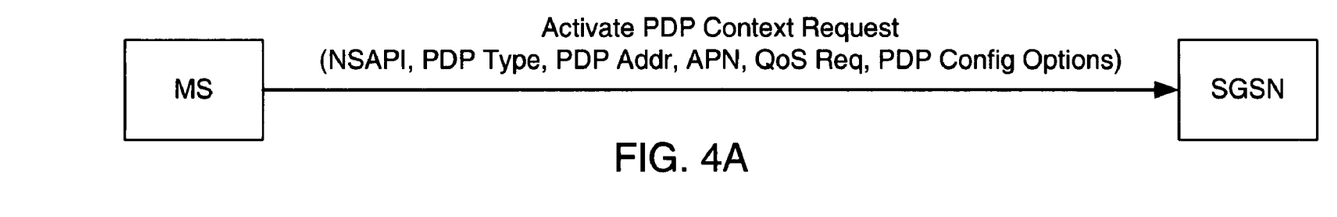
FIGS. 4a-4d illustrate a prior art conventional PDP (Packet Data Protocol) context activation sequence within a GPRS network.
Figure 4B:
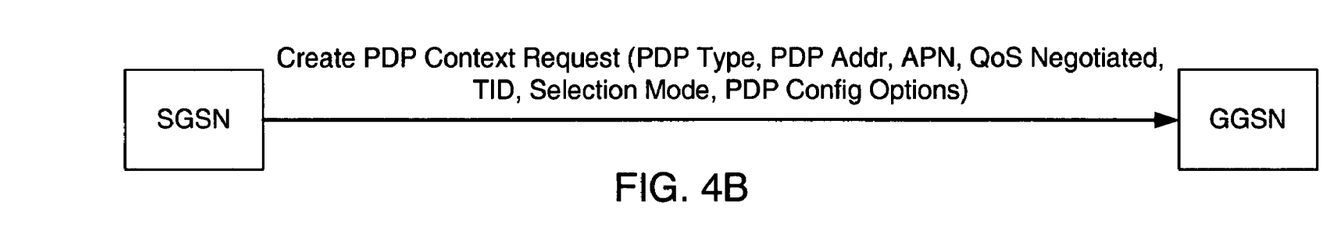
Figure 4C:
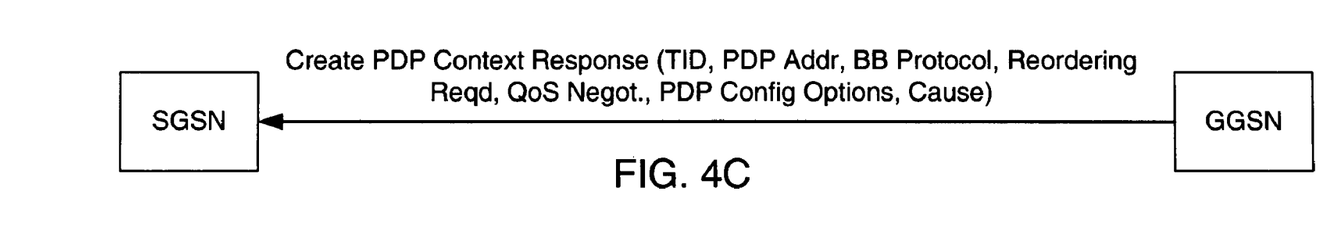
Figure 4D:
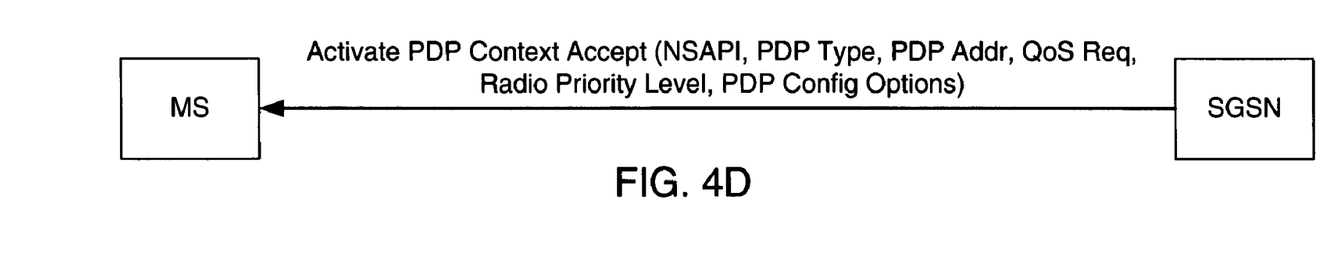

FIGS. 4*a*-4*d* illustrate a conventional PDP (Packet Data Protocol) context activation sequence within a GPRS network. During the first step of a conventional PDP context activation shown in FIG. 4*a*, an MS sends an Activate PDP Context Request message to an SGSN through a BSS. The Activate PDP Context Request message contains appropriate information in the NSAPI, PDP type, PDP Addr, APN, QoS Req, and PDP Config Options in a well-known manner. In FIG. 4*b*, the SGSN sends a Create PDP Context Request message to a GGSN containing appropriate information in the PDP Type, PDP Addr, APN, QoS Negotiated, TID, Selection Mode, PDP Config Options fields. In FIG. 4*c*, the GGSN sends a Create PDP Context Response message to the SGSN containing appropriate information in the TID, PDP Addr, BB Protocol, Reordering Reqd, QoS Negot., PDP Config Options and Cause fields. In FIG. 4*d*, the SGSN then sends an Activate PDP Context Accept message to the MS containing appropriate information in the NSAPI, PDP Type, PDP Addr, QoS Req, Radio Priority Level and PDP Config Options field.

Nevertheless, the GPRS standard does not specify whether private or public IP addresses are assigned to a requesting MS. Address assignment is not a standardization issue because a NAT is currently used at a PLMN boundary when private IP addresses are used. That is, current GPRS deployments rely on NATs at the GGSN when private addresses are assigned to a requesting MS. While this handles the problem of conserving IPv4 addresses, end-to-end security or application friendliness is not provided.

Even though a conventional PDP context activation procedure within a GPRS network assigns an IPv4 address to a mobile station, what is needed is a technique for assigning an IPv4 address to a mobile station in a GPRS network or a GPRS-based network that conserves IPv4 addresses and simultaneously maintains end-to-end security and application friendliness.

BRIEF SUMMARY OF THE INVENTION

The present invention provides a technique for assigning an IPv4 address to a mobile station in a GPRS or a GPRS-based network that conserves IPv4 addresses and simultaneously maintains end-to-end security and application friendliness. The present invention also provides a technique for assigning an IPv6 address to a mobile station in a GPRS or a GPRS-based network that conserves IPv6 addresses and simultaneously maintains end-to-end security and application friendliness.

The advantages of the present invention are provided by a General Packet Radio System (GPRS) communications network that includes a Serving GPRS Support Node (SGSN) and a Gateway GPRS Support Node (GGSN). The SGSN receives an Activate Packet Data Protocol (PDP) Context Request message from a mobile station of the GPRS communications network. The Activate PDP Context Request message has an APN field that contains information relating to a request for one of a private network address and a public network address. The SGSN sends a Create PDP Context Request message to the GGSN in response to the Activate PDP Protocol Context Request. The Create PDP Context Request message has an APN field that contains information relating to a request for one of a private network address and a public network address. The GGSN assigns one of a private network address and a public network address to the mobile station in response to the Create PDP Context Request message, and sends a Create PDP Context Response message to the SGSN containing the information assigning one of a private network address and a public network address to the mobile station. In turn, the SGSN sends an Activate PDP Context Accept message to the mobile station in response to the Create PDP Context Response message. The Activate PDP Context Accept message contains information assigning one of a private network address and a public network address to the mobile station based on the information contained in the APN field of the Activate PDP Context Request message.

According to another aspect of the invention, a GPRS-based communications network includes an SGSN, a (GGSN) and a Border Gateway (BG). The SGSN receives an Activate Packet Data Protocol (PDP) Context Request message from a mobile station of the GPRS-based communications network, such that the Activate PDP Context Request message has an APN field containing information relating to a request for one of a private network address and a public network address. The SGSN sends a Create PDP Context Request message from the SGSN to the BG in response to the Activate PDP Protocol Context Request. Accordingly, the Create PDP Context Request message has an APN field containing information relating to a request for one of a private network address and a public network address. The BG assigns one of a private network address and a public network address to the mobile station in response to the Create PDP Context Request message, and sends a Create PDP Context Response message from the BG to the SGSN containing the information assigning one of a private network address and a public network address to the mobile station based on the information contained in the APN field of the Create PDP Context Request message. The SGSN the sends an Activate PDP Context Accept message to the mobile station in response to the Create PDP Context Response message, such that the Activate PDP Context Accept message contains information assigning one of a private network address and a public network address to the mobile station based on the information contained in the APN field of the Activate PDP Context Request message. Alternatively, the SGSN sends the Create PDP Context Request message from the SGSN to the GGSN in response to the Activate PDP Protocol Context Request, and the GGSN sends the Create PDP Context Request message from the GGSN to the BG. Accordingly, the BG sends the Create PDP Context Response message from the BG to the GGSN and the GGSN sends the Create PDP Context Response message to from the GGSN to the SGSN.

BRIEF DESCRIPTION OF THE DRAWINGS

The present invention is illustrated by way of example and not by way of limitation in the accompanying figures in which like reference numerals indicate similar elements and in which.

DETAILED DESCRIPTION OF THE INVENTION

The present invention provides an RSIP-type technique that is used for assigning a network address to a mobile station in a GPRS network or a GPRS-based network (e.g., Universal Mobile Telecommunications System (UMTS)) that conserves IPv4 addresses and simultaneously maintains end-to-end security and application friendliness. Because the present invention relates to both IPv4 and IPv6 addresses, the term PDP, as used herein, is intended to be synonymous with both IPv4 and IPv6 addresses.

Figure 5:
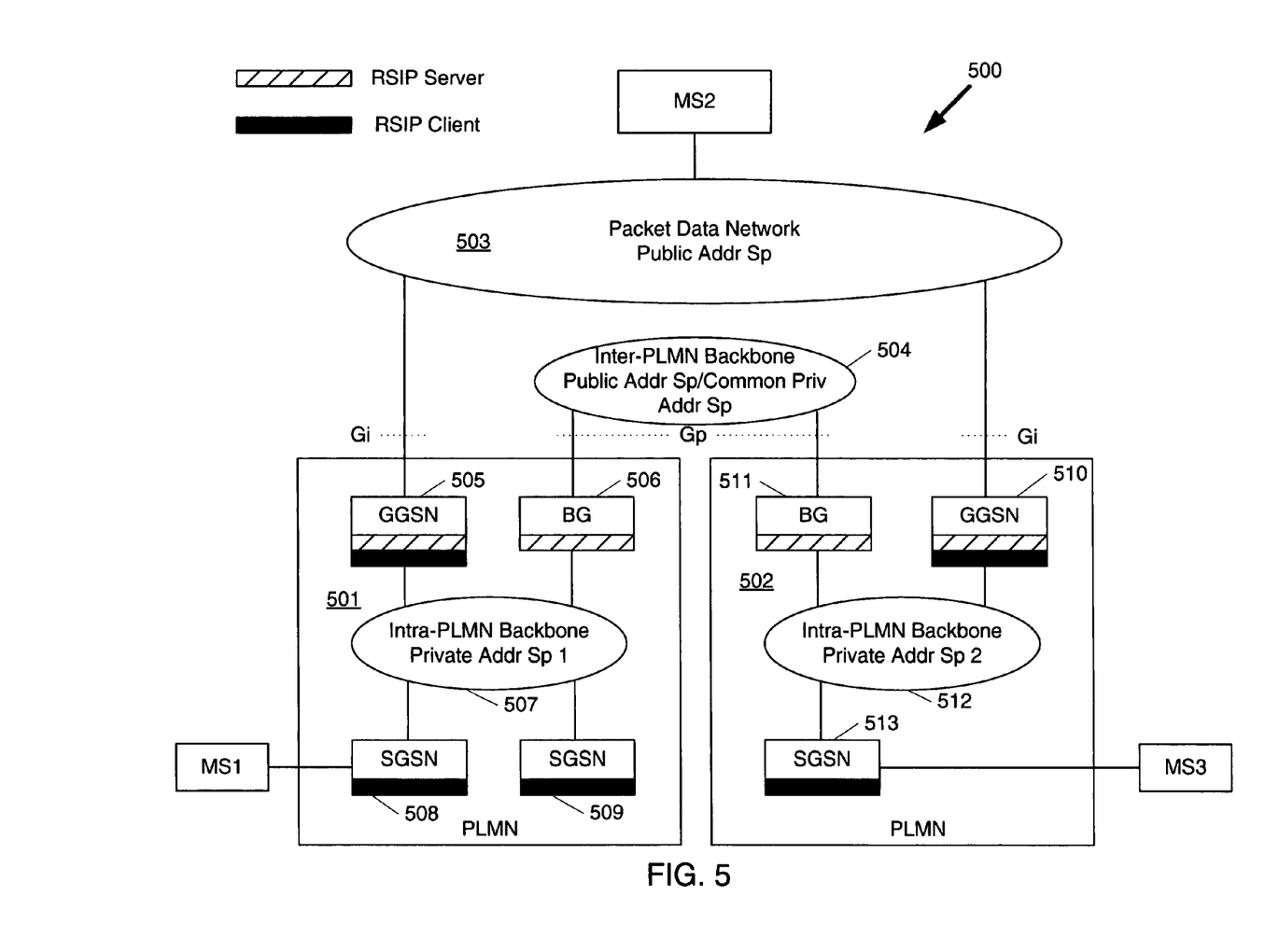
FIG. 5 shows a GPRS network arrangement providing RSIP server functionality according to the present invention.

FIG. 5 shows a GPRS network arrangement 500 providing RSIP functionality, and thereby provides the RSIP protocol for IPv4 and for IPv6 address assignment according to the present invention. It should be understood that GPRS network arrangement 500 can also be a GPRS-based network, such as UMTS. GPRS network arrangement 500 includes a public land mobile network (PLMN) administrative domain 501 and a PLMN administrative domain 502 that are coupled together through a packet data network 503, such as the Internet, and an inter-PLMN backbone network 504. A mobile station (MS) 2 is coupled to packet data network 503 in a well-known manner. Packet data network 503 provides a public address space, and inter-PLMN backbone network 504 provides a public address space/common private address space. PLMN 501 includes a Gateway GPRS Support Node (GGSN) 505, a Border Gateway (BG) 506, an intra-PLMN backbone 507 providing a private address space, a Serving GPRS Support Node (SGSN) 508, and an SGSN 509. An MS 1 is coupled to SGSN 508 in a well-known manner. While only one GGSN, one BG, and two SGSNs are shown as part of PLMN administrative domain 501, it should be understood that PLMN 501 could include any number of GGSNs, BGs and SGSNs. Moreover, while only a single MS 1 is shown in FIG. 5 as being associated with PLMN administrative domain 501 and a single MS 2 as being associated with packet data network 503, it should be understood that a plurality of MSs could be coupled to any of the SGSNs of PLMN administrative domain 501 and with packet data network 503.

PLMN 502 includes a GGSN 510, a BG 511, an intra-PLMN backbone 512 providing a private address space, and an SGSN 513. An MS 3 is coupled to SGSN 513 in a well-known manner. While only one GGSN, one BG, and one SGSN are shown as part of PLMN administrative domain 502, it should be understood that PLMN 502 could include any number of GGSNs, BGs and SGSNs. Additionally, while only a single MS 3 is shown in FIG. 5 as being associated with PLMN administrative domain 502, it should be understood that a plurality of MSs could be coupled to any of the SGSNs of PLMN administrative domain 502. It should also be understood that GPRS network arrangement 500 could include any number of PLMN administrative domains.

According to one embodiment of the invention, RSIP client functionality is provided at the SGSNs and the GGSNs, but is not needed at the MS or at the BGs. Further, RSIP server functionality is provided at GGSNs and BGs, but is not needed either at the MS or at the SGSNs.

For example, when MS 1 within PLMN 501 intends to communicate with MS 2 within public data network 503 (e.g., the Internet), MS 1 needs to use a public IP address to communicate with MS 2 because MS 2 has a public IP address. When a public IP address has not already been assigned to MS 1, MS 1 sends an Activate PDP Context Request message to SGSN 508, similar to FIG. 4. The APN field in the Activate PDP Context Request message indicates that a public IP address is desired. Upon receiving the Activate PDP Context Request message having the APN field set, SGSN 508 initiates an RSIP Request message requesting an assignment of a public address. When GGSN 505 receives the RSIP Request message, GGSN 505, operating as an RSIP server, returns a suitable RSIP Response message containing the public IP address corresponding to the request from MS 1. When SGSN 508 receives the RSIP Response message from GGSN 505, SGSN 508 sends an Activate PDP Context Accept message to MS 1 containing the assigned public IP address.

Another example is when MS 1 within PLMN 501 intends to communicate with MS 3 within PLMN 502 through Inter-PLMN backbone 503. Inter-PLMN backbone 503 uses an address space that may either be private or public. Consequently, the address space used by Inter-PLMN backbone 503 for this example will be referred to as X. Thus, MS 1 needs to be assigned an IP address from address space X. MS 1 sends an Activate PDP Context Request message to SGSN 508. The APN field of the Activate PDP Context Request message indicates that an IP address from address space X is desired. Upon receiving the Activate PDP Context Request message having the APN field set, SGSN 508 can respond in one of two ways. First, SGSN 508, acting as an RSIP client, can send an RSIP request message to GGSN 505, which would be acting as an RSIP server. GGSN 505, acting as an RSIP client, then would send an RSIP request message to BG 506, which would be acting as an RSIP server. The response then traces its way back from BG 506 to GGSN 505 to SGSN 508. Alternatively, SGSN 508, acting as an RSIP client, would send an RSIP request message directly to BG 506, which would be acting as an RSIP server. SGSN 508 then receives a suitable RSIP response from BG 506. In either situation, SGSN 508 sends an appropriate Activate PDP Context Accept message to MS 1 that contains the IP address assigned upon receiving the RSIP response.

According to a second embodiment of the present invention, one of the fields in the Activate PDP Context Request message that is sent from the MS to the SGSN is the Access Point Name (APN) field. As previously mentioned, the current GPRS standard for assigning IPv4 addresses does not disclose a private or public IP address assignment to a requesting MS. In contrast, the present invention provides an MS that utilizes the APN field of the Activate PDP Context Request message as an extensible field by inserting information into the APN field for requesting either a public or a private address assignment. Moreover, the inserted information relating to whether a public or a private address assignment is desired can be an explicit indication, such as a particular bit (or bits) of the APN field being set, or implicit by the address of a GGSN contained in the APN field. When the indication is implicit, the SGSN determines the desired address assignment (public or private) based on the indicated GGSN. When the indicated GGSN interfaces to a public administrative domain, then the desired address is a public address. Conversely, when the indicated GGSN interfaces with a private administrative domain, then the desired address is a private address.

An SGSN then uses the information contained in the APN field for selecting a suitable GGSN for sending the Create PDP Context Request message. The Create PDP Context Request message sent from the SGSN to the selected GGSN transparently contains the APN field that was used within the Activate PDP Context Request message that was sent from the requesting MS to the SGSN.

Figure 6:
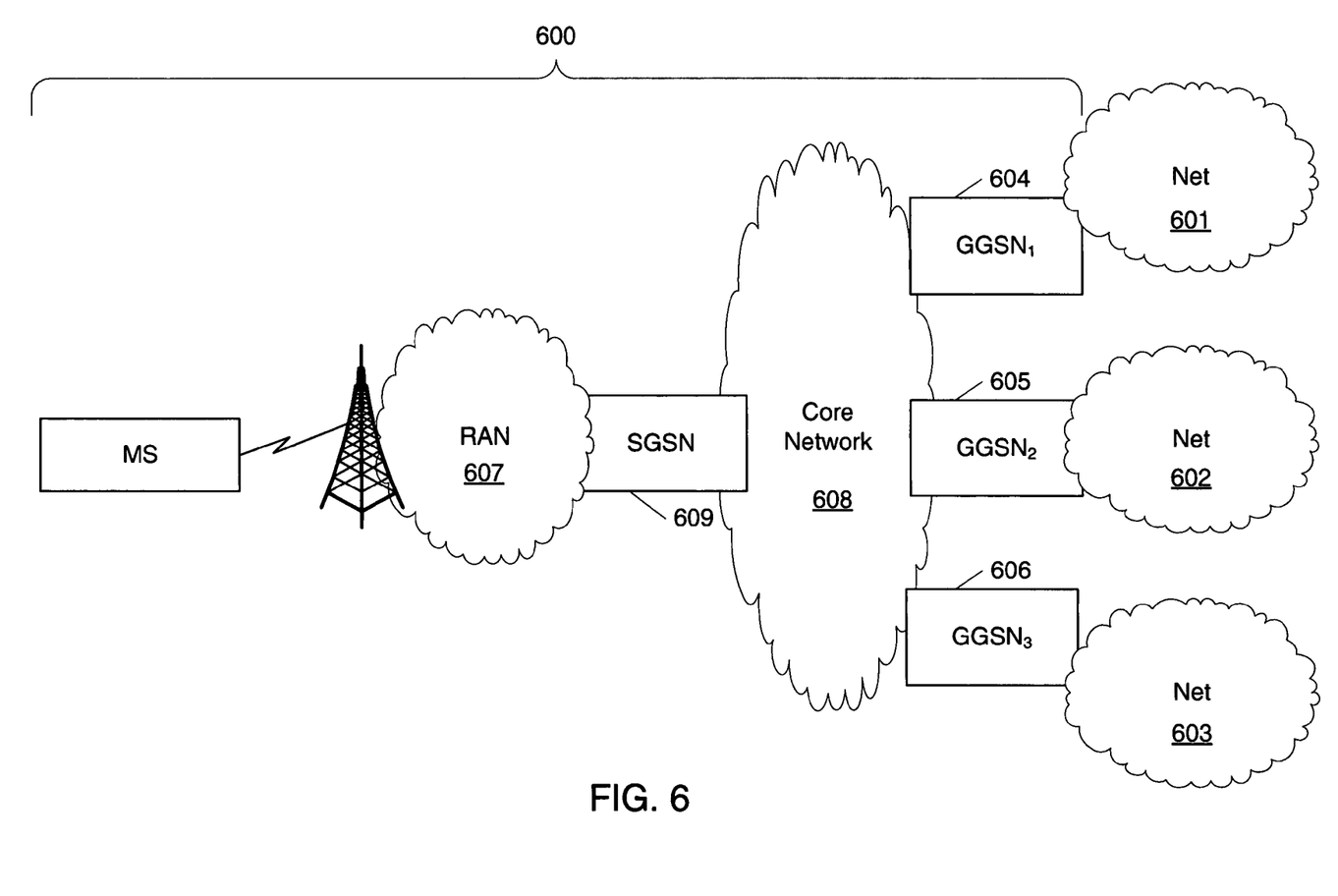
FIG. 6 shows a PLMN administrative domain for illustrating the process of an SGSN selecting a GGSN according to the present invention.

FIG. 6 shows a PLMN administrative domain 600 for illustrating the process of an SGSN selecting a GGSN according to the present invention. PLMN administrative domain 600 is coupled to three different administrative domains 601, 602 and 603 through GGSNs 604, 605 and 606, respectively, in a well-known manner. Administrative domains 601, 602 and 603 can be private or public administrative domains. PLMN administrative domain 600 also includes a Radio Access Network (RAN) 607 that is coupled to a core network 608 through an SGSN 609 in a well-known manner. GGSNs 604, 605 and 606 are each coupled to core network 609 in a well-known manner. Depending on the information contained in the APN field in the Activate PDP Context Request message that is sent from a requesting MS to SGSN 609, SGSN 609 selects a suitable GGSN (i.e., one of GGSN 604, GGSN 605 or GGSN 606). The Create PDP Context Request message is then sent from SGSN 609 to the selected GGSN.

According to one embodiment of the present invention, a requesting MS indicates a preference for a private or a public address that is known to a GGSN using information contained in the APN field of a Create PDP Context Request message. Subsequently, the appropriate GGSN uses the information contained in the APN field for assigning a private address or a public address to the requesting MS.

Referring to FIG. 5 to illustrate another aspect of the present invention in which mobility is not a factor, consider the situation of a datagram having an outer IP header and that is sent between an SGSN and a GGSN of the same PLMN, for example, PLMN 501. In such a situation, private addresses can always be used and, consequently, RSIP client or server functionality is not needed within any GPRS network element.

In the situation that the outer IP header of a datagram that is sent between an SGSN and GGSN in which SGSN and GGSN belong to different PLMNs, for example, when SGSN 508, which is part of PLMN 501, and GGSN 510, which is part of PLMN 501, two pairs of RSIP client-server functionality are required. For the first pair of RSIP client-server functionality, the RSIP client is located at SGSN 508 and an RSIP server is located at BG 506 in PLMN 501. For the second pair of RSIP client-server functionality, an RSIP client located at GGSN 510 and an RSIP server located at BG 511 in PLMN 502.

In the situation of a datagram having an inner IP header, an RSIP client is located at the SGSN and an RSIP server is located at the GGSN, regardless whether the GGSN and the SGSN are within the same PLMN or are in different PLMNs.

Again referring to FIG. 5 to illustrate yet another aspect of the present invention in which mobility is a factor, consider the situation in which a requesting MS that is associated with SGSN 513, such as MS 3, moves to a different location and is subsequently associated with, for example, SGSN 508. In this situation, consider the GGSN to be GGSN 510 and consider the outer IP header of a datagram. For this situation, two pairs of RSIP client-server functionality are required. For the first pair of RSIP client-server functionality, an RSIP client is located at SGSN 508 and an RSIP server located at BG 506. For the second pair of RSIP client-server functionality, an RSIP client is located at GGSN 510 and an RSIP server located at BG 511. This situation is identical to the situation without mobility because the outer IP header of the datagram is being used.

For the same scenario, now consider the inner IP header. In this situation, three pairs of RSIP client server functionalities are required. For the first RSIP client-server functionality, an RSIP client located at SGSN 513 and an RSIP server is located at GGSN 510. For the second RSIP client server functionality, an RSIP client is located at GGSN 510 and an RSIP server is located at BG 511. For the third RSIP client server functionality, an RSIP client is located at SGSN 508 and an RSIP server is located at GGSN 505.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method comprising:
   receiving an Activate Packet Data Protocol (PDP) Context Request message at a Serving General Packet Radio System (GPRS) Support Node (SGSN) of a network from a mobile station of the network, the Activate PDP Context Request message having an APN (Access Point Name) field containing information that explicitly indicates requesting either a private network address or a public network address to be assigned to the mobile station; and
   sending an Activate PDP Context Accept message to the mobile station containing information assigning one of a private network address and a public network address to the mobile station based on the information contained in the APN field of the Activate PDP Context Request message.

2. The method according to claim 1, further comprising:
   sending a Create PDP Context Request message from the SGSN to a Gateway General Packet Radio System (GPRS) Support Node (GGSN) of the network, the Create PDP Context Request message having an APN field containing information relating to a request for either a private network address or a public network address for the mobile station; and
   receiving a Create PDP Context Response message from the GGSN containing information assigning either a private network address or a public network address to the mobile station based on the information contained in the APN field of the Activate PDP Context Request message.

3. The method according to claim 2, further comprising:
receiving the Create PDP Context Request message from the SGSN at the GGSN;
assigning either a private network address or a public network address to the mobile station based on the information contained in the APN field of the Create PDP Context Request message and
sending the Create PDP Context Response message from the GGSN to the SGSN containing the information assigning either a private network address or a public network address to the mobile station based on the information contained in the APN field of the Create PDP Context Request message.

4. The method according to claim 1, further comprising:
sending a Create PDP Context Request message from the SGSN to a Border Gateway (BG) of the network, the Create PDP Context Request message having an APN field containing information relating to a request for either a private network address or a public network address for the mobile station; and
receiving a Create PDP Context Response message at the SGSN from the BG containing information assigning either a private network address or a public network address to the mobile station based on the information contained in the APN field of the Activate PDP Context Request message.

5. The method according to claim 4, further comprising:
receiving the Create PDP Context Request message at the BG;
assigning either a private network address or a public network address to the mobile station based on the information contained in the APN field of the Create PDP Context Request message; and
sending the Create PDP Context Response message to the SGSN containing the information assigning either a private network address or a public network address to the mobile station based on the information contained in the APN field of the Create PDP Context Request message.

6. The method according to claim 5, further comprising:
sending the Create PDP Context Request message from the SGSN to a Gateway General Packet Radio System (GPRS) Support Node (GGSN) of the network;
sending the Create PDP Context Request message from the GGSN to the BG;
receiving the Create PDP Context Response message at the GGSN from the BG; and
receiving the Create PDP Context Response message at the SGSN from the GGSN.

7. The method according to claim 1, further comprising receiving at the mobile station the Activate PDP Context Accept message containing the information relating to an assignment of either a private network address or a public network address to the mobile station based on the information contained in the APN field of the Activate PDP Context Request message.

8. The method according to claim 1, wherein in the receiving and sending, the information comprises one or more parameters that explicitly indicates requesting either a private network address or a public network address to be assigned to the mobile station.

9. A method comprising:
receiving a Create Packet Data Protocol (PDP) Context Request message from a Serving General Packet Radio System (GPRS) Support Node (SGSN) at a Gateway General Packet Radio System (GPRS) Support Node (GGSN), the Create PDP Context Request Message having an APN (Access Point Name) field containing information that explicitly indicates requesting either a private network address or a public network address to be assigned to a mobile station of the network;
assigning either a private network address or a public network address to the mobile station based on the information contained in the APN field of the Create PDP Context Request message; and
sending the Create PDP Context Response message from the GGSN to the SGSN containing the information assigning either a private network address or a public network address to the mobile station based on the information contained in the APN field of the Create PDP Context Request message.

10. A method comprising:
receiving a Create Packet Data Protocol (PDP) Context Request message from a Serving General Packet Radio System (GPRS) Support Node (SGSN) at a Border Gateway (BG), the Create PDP Context Request Message having an APN (Access Point Name) field containing information that explicitly indicates requesting either a private network address or a public network address to be assigned to a mobile station of a network;
assigning either a private network address or a public network address to the mobile station based on the information contained in the APN field of the Create PDP Context Request message and
sending the Create PDP Context Response message from the BG to the SGSN containing the information assigning either a private network address or a public network address to the mobile station based on the information contained in the APN field of the Create PDP Context Request message.

11. A method comprising:
sending an Activate Packet Data Protocol (PDP) Context Request message to a Serving General Packet Radio System (GPRS) Support Node (SGSN) of a network from a mobile station of the network, the Activate PDP Context Request message having an APN (Access Point Name) field containing information containing information that explicitly indicates requesting either a private network address or a public network address to be assigned to the mobile station; and
receiving at the mobile station an Activate PDP Context Accept message containing information relating to an assignment of either a private network address or a public network address to the mobile station based on the information contained in the APN field of the Activate PDP Context Request message.

12. The method according to claim 11, wherein the private network address and the public network address are each one of an IPv4 network address and an IPv6 network address.

13. The method according to claim 11, wherein the network is a GPRS communications network.

14. The method according to claim 11, wherein the network is a Universal Mobile Telecommunications System.

15. An apparatus comprising a processor and a memory storing instructions that, when executed, the apparatus is configured to:
receive an Activate Packet Data Protocol (PDP) Context Request message from a mobile station of a network, the Activate PDP Context Request message having an APN (Access Point Name) field containing information that explicitly indicates requesting either a private network address or a public network address to be assigned to the mobile station; and send an Activate PDP Context Accept message to the mobile station containing information assigning either a private network address or a public network address to the mobile station based on the information contained in the APN field of the Activate PDP Context Request message.

16. The apparatus according to claim 15, wherein the instructions, when executed, the apparatus is configured to:

send a Create PDP Context Request to a Gateway General Packet Radio System (GPRS) Support Node (GGSN) of the network, the Create PDP Context Request message having an APN field containing information relating to a request for either a private network address or a public network address for the mobile station; and receive a Create PDP Context Response message from the GGSN containing information assigning either a private network address or a public network address to the mobile station based on the information contained in the APN field of the Activate PDP Context Request message.

17. The apparatus according to claim 15, wherein the instructions, when executed, the apparatus is configured to:

send a Create Packet Data Protocol (PDP) Context Request message to a Border Gateway (BG) of a network, the Create PDP Context Request message having an APN field containing information relating to a request for either a private network address or a public network address for the mobile station; and receive a Create PDP Context Response message from the BG containing information assigning either a private network address or a public network address to the mobile station based on the information contained in the APN field of the Activate PDP Context Request message.

18. The apparatus according to claim 15, wherein the private network address and the public network address are each one of an IPv4 network address and an IPv6 network address.

19. The apparatus according to claim 15, wherein the network is a GPRS communications network.

20. The apparatus according to claim 15, wherein the network is a Universal Mobile Telecommunications System.

21. The apparatus according to claim 15, wherein the information comprises one or more parameters that explicitly indicates requesting either a private network address or a public network address to be assigned to the mobile station.

22. An apparatus comprising a processor and a memory storing instructions that, when executed, the apparatus is configured to:

receive a Create Packet Data Protocol (PDP) Context Request message from a Serving General Packet Radio System (GPRS) Support Node (SGSN), the Create PDP Context Request Message having an APN (Access Point Name) field containing information that explicitly indicates requesting either a private network address or a public network address to be assigned to a mobile station of a network;

assign either a private network address or a public network address to the mobile station based on the information contained in the APN field of the Create PDP Context Request message; and send the Create PDP Context Response message to the SGSN containing the information assigning either a private network address or a public network address to the mobile station based on the information contained in the APN field of the Create PDP Context Request message.

23. An apparatus comprising a processor and a memory storing instructions that, when executed, the apparatus is configured to:

receive a Create PDP Context Request message from a Serving General Packet Radio System (GPRS) Support Node (SGSN) of a network, the Create PDP Context Request message having an APN (Access Point Name) field containing one or more parameters that explicitly indicates requesting either a private network address or a public network address to be assigned to a mobile station of the network;

assign either a private network address or a public network address to the mobile station based on the information contained in the APN field of the Create PDP Context Request message; and send the Create PDP Context Response message to the SGSN containing the information assigning either a private network address or a public network address to the mobile station based on the information contained in the APN field of the Create PDP Context Request message.

24. An apparatus comprising a processor and a memory storing instructions that, when executed, the apparatus is configured to:

send an Activate Packet Data Protocol (PDP) Context Request message to a Serving General Packet Radio System (GPRS) Support Node (SGSN) of a network, the Activate PDP Context Request message having an APN (Access Point Name) field containing information containing information that explicitly indicates requesting either a private network address or a public network address to be assigned to the mobile station; and receive an Activate PDP Context Accept message containing information relating to an assignment of either a private network address or a public network address to the mobile station based on the information contained in the APN field of the Activate PDP Context Request message.

25. The apparatus according to claim 24, wherein the private network address and the public network address are each one of an IPv4 network address and an IPv6 network address.

26. A system comprising:

a Serving General Packet Radio System (GPRS) Support Node (SGSN) configured to send a Create Packet Data Protocol (PDP) Context Request to a Gateway General Packet Radio System (GPRS) Support Node (GGSN) of a network, the Create PDP Context Request message having an APN (Access Point Name) field containing one or more parameters that explicitly indicates requesting either a private network address or a public network address to be assigned to a mobile station of the network;

a GGSN configured to send the Create PDP Context Request message to a Border Gateway (BG); and a BG configured to send a Create PDP Context Response message to the GGSN, the SGSN configured to receive the Create PDP Context Response from the GGSN.

* * * * *